US010837531B2

(12) United States Patent
Curtis et al.

(10) Patent No.: US 10,837,531 B2
(45) Date of Patent: Nov. 17, 2020

(54) ACTUATOR

(71) Applicant: Eaton Intelligent Power Limited, Dublin (IE)

(72) Inventors: Tyler Q. Curtis, Rockford, MI (US); Aaron M. Klap, Rockford, MI (US)

(73) Assignee: Eaton Intelligent Power Limited, Dublin (IE)

(*) Notice: Subject to any disclaimer, the term of this patent is extended or adjusted under 35 U.S.C. 154(b) by 125 days.

(21) Appl. No.: 16/169,163

(22) Filed: Oct. 24, 2018

(65) Prior Publication Data

US 2019/0120349 A1 Apr. 25, 2019

Related U.S. Application Data

(60) Provisional application No. 62/576,310, filed on Oct. 24, 2017.

(51) Int. Cl.
*F16H 25/20* (2006.01)
*F16H 25/22* (2006.01)
*B64C 13/28* (2006.01)

(52) U.S. Cl.
CPC ....... *F16H 25/205* (2013.01); *F16H 25/2204* (2013.01); *B64C 13/28* (2013.01); *F16H 2025/2081* (2013.01)

(58) Field of Classification Search
CPC .... F16H 25/20; F16H 25/2003; F16H 25/205; F16H 25/2204; F16H 25/24; F16H 25/2454; F16H 25/2472; F16H 2025/2028; F16H 2025/204; F16H 2025/2081; B64C 13/28; B64C 13/341
See application file for complete search history.

(56) References Cited

U.S. PATENT DOCUMENTS 4,607,180 A * 8/1986 Stoody ................ F16H 25/2018 310/112
8,033,500 B1 10/2011 Charafeddine et al.
2009/0021092 A1* 1/2009 Elliott .................. F16H 25/205 310/83
2011/0006154 A1* 1/2011 Maresko ................ F16D 7/007 244/99.2
2011/0048147 A1* 3/2011 Keech .................. B64C 13/341 74/89.26
2016/0340026 A1* 11/2016 Antunes ............. F16H 25/2472

OTHER PUBLICATIONS

Section 6.9.3, SAE AIR6226 "Trimmable Horizontal Stabilizer Actuator Structural Load Path Integrity Monitoring Principles", dated Oct. 8, 2014; 1 page.

* cited by examiner

*Primary Examiner* — Prasad V Gokhale
(74) *Attorney, Agent, or Firm* — Fishman Stewart PLLC

(57) ABSTRACT

An actuator includes a housing member configured for connection with a first component, a drive screw connected to the housing member, a rod disposed at least partially in the drive screw and at least partially in the housing member, a retaining nut connected to the rod, a mounting member configured for connection with the first component, and a drive nut engaged with the drive screw and configured for connection with a second component. If the drive screw mechanically disconnects or is fractured, the rod may be configured to translate to engage one or more friction surfaces to restrict back driving of the drive screw.

22 Claims, 1 Drawing Sheet

42 46 10 52 54 58 92 90 24 22 56 72D 54D 52D 50D 20 12 50 14 16 32 72 70 18 44 94 80 40 30

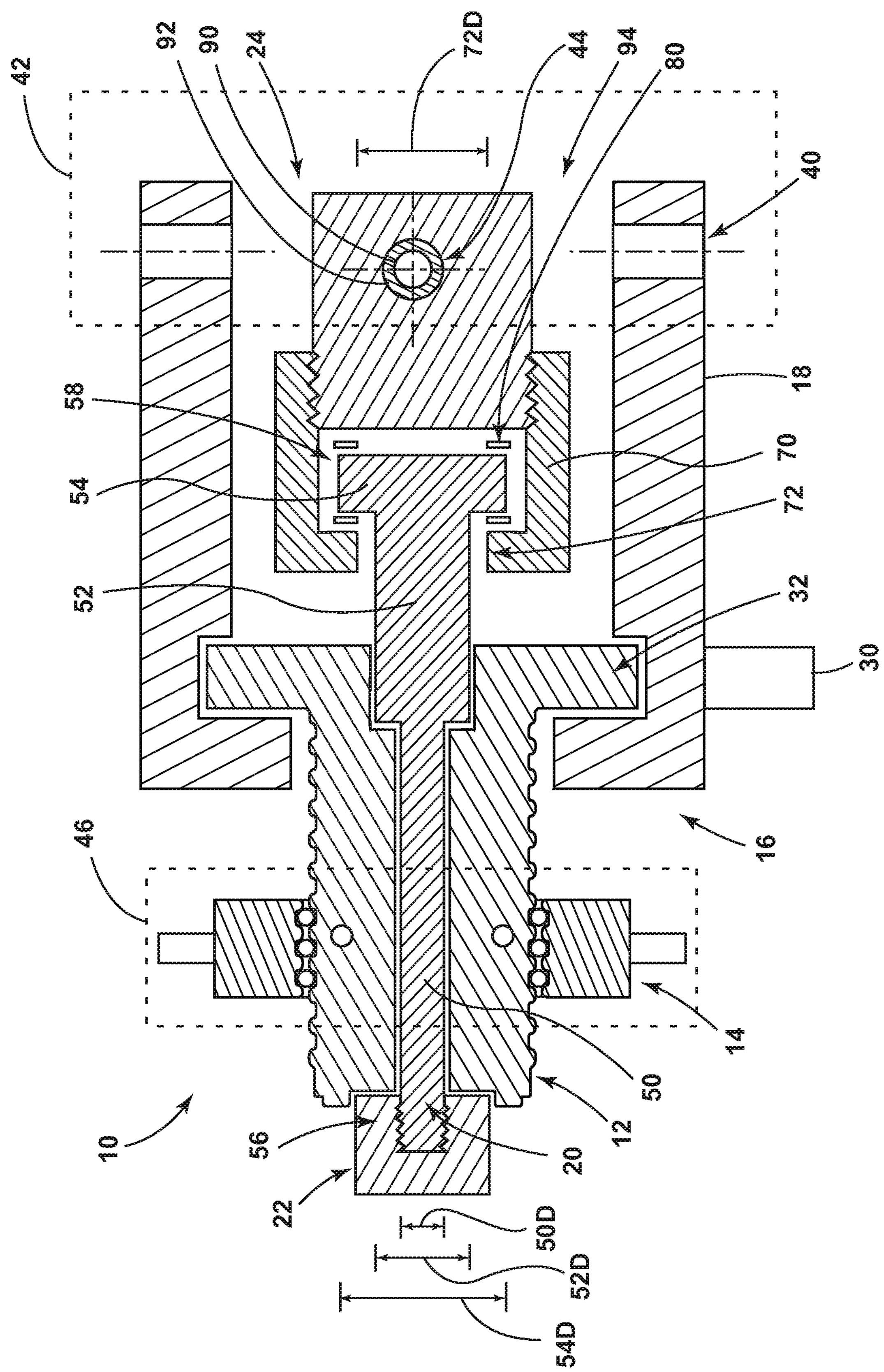
92
90
24
72D
44
94
80
42
40
18
58
70
54
72
52
32
30
16
46
14
50
12
10
56
20
22
50D
52D
54D

ACTUATOR

CROSS-REFERENCE TO RELATED APPLICATION

This application claims the benefit of United States Provisional Patent Application Ser. No. 62/576,310, filed on Oct. 24, 2017, the disclosure of which is hereby incorporated herein by reference in its entirety.

TECHNICAL FIELD

The present disclosure generally relates to actuators, including linear actuators that may be used in connection with aircraft.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some actuators may include redundancy in load paths to prevent separation of components connected to the actuators (e.g., separation of control surfaces from aircraft structures). Some actuators do not provide any indication that backup components have failed, and/or it may be difficult to determine if backup components have failed. For example and without limitation, a gearbox housing may be included in a secondary/redundant load path and detecting an error in a primary load path and/or a secondary load path of the drive screw and other components may include removal of the actuator (e.g., from an installed location, such as an aircraft), disassembly, and/or detailed inspection. Additionally or alternatively, some designs may include complex housing designs if a housing is part of a redundant load path.

An example of an actuator is described in U.S. Pat. No. 8,281,678, which is owned by the assignee hereof and is hereby incorporated by reference in its entirety as though fully set forth herein.

There is a desire for solutions/options that minimize or eliminate one or more challenges or shortcomings of actuators. The foregoing discussion is intended only to illustrate examples of the present field and should not be taken as a disavowal of scope.

SUMMARY

In embodiments, an actuator may include a housing member configured for connection with a first component; a drive screw connected to the housing member; a rod disposed at least partially in the drive screw and/or at least partially in the housing member; a retaining nut connected to the rod; a mounting member configured for connection with the first component; and/or a drive nut engaged with the drive screw and configured for connection with a second component. If the drive screw mechanically disconnects or is fractured (e.g., there is a mechanical failure or complete fracture due to crack or damage), the rod may be configured to translate to engage one or more friction surfaces to restrict back driving of the drive screw. A primary load path may include the drive screw, the drive nut, a drive assembly, and/or the housing member. The housing member may include a primary mounting portion. A secondary load path may include the rod, the retaining nut, the one or more friction surfaces, and/or the mounting member. A pin may be connected to the mounting member. The pin may be configured to detect a failure in the primary load path. The secondary load path may not include the housing member. A sensor may be connected in the secondary load path and may be configured to sense or detect a failure in the primary load path. The one or more friction surfaces may be disposed on one or both of the rod and the mounting member. The mounting member may be configured to restrict axial movement of the rod.

With embodiments, an actuator may include a drive assembly. The drive assembly may be configured to rotate the drive screw to cause translation of the drive nut along the drive screw. The drive assembly may include a motor connected to a gear train. The gear train may be connected to the drive screw. The rod may include a first portion, a second portion, and/or a third portion. A diameter of the third portion may be larger than a diameter of the second portion. The diameter of the second portion may be larger than a diameter of the first portion. At least some of the first portion and the second portion may be disposed in the drive screw. The mounting member may be configured to retain the third portion. The mounting member may include an aperture. A diameter of the aperture may be larger than the diameter of the second portion and smaller than the diameter of the third portion.

In embodiments, a retaining nut may be connected to a first end of the rod and a third portion of the rod may be disposed at a second end of the rod. The first portion may extend axially beyond the drive screw in a first direction. The second portion may extend axially beyond the drive screw in a second direction. The mounting member may be disposed at least partially within the housing member. The mounting member may not be directly connected to the housing member. The housing member may include a first mounting portion. The mounting member may include a second mounting portion. The second mounting portion may be independent of the first mounting portion.

The foregoing and other aspects, features, details, utilities, and/or advantages of embodiments of the present disclosure will be apparent from reading the following description, and from reviewing the accompanying drawings.

BRIEF DESCRIPTION OF THE DRAWING

FIG. 1 is a cross-sectional view generally illustrating an embodiment of an actuator according to aspects and teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

With embodiments, such as generally illustrated in FIG. 1, an actuator 10 may include a drive screw 12 (e.g., a ball screw), a drive nut 14 (e.g., a ball nut), a drive assembly 16, a housing member 18, a rod 20, a retaining nut 22, and/or a mounting member 24. The drive nut 14 may be engaged with the drive screw 12 such that rotation of one of the drive nut 14 and the drive screw 12 may cause translation of the other of the drive nut 14 and the drive screw 12.

In embodiments, the drive assembly 16 may be connected to the drive screw 12 and may be configured to cause rotation of the drive screw 12. The drive assembly 16 may include and/or be connected to the housing member 18. The drive assembly 16 may include a motor 30 and/or a drive gear 32 (or a drive train). The drive gear 32 may be connected to and/or incorporated with the drive screw 12. The motor 30 may be configured to drive the drive gear 32 to cause rotation of the drive screw 12, which may cause or result in translation of the drive nut 14.

In embodiments, the housing member 18 may include a first/primary mounting portion 40 that may be connected to a first component 42, such as an aircraft component/structure. The mounting member 24 may include a second mounting portion 44 (e.g., a secondary or redundant mounting portion) that may be connected to the first component 42. The first mounting portion 40 and the second mounting portion 44 may be independent of each other and may be separately connected to the first component 42 (e.g., may be configured to transfer loads to and/or from the first component 42 independently of each other). The drive nut 14 may be connected to a second component 46, such as a second aircraft component/structure. The actuator 10 may be configured cause the second component 46 to move relative to the first component 42 (or vice versa). For example and without limitation, rotation of the drive screw 12, such as via the motor 30 and the drive gear 32, may cause translation of the drive nut 14, which may cause movement (e.g., rotation, translation, etc.) of the second component 46 relative to the first component 42.

With embodiments, the rod 20 may include one or more of a variety of shapes, sizes, configurations, and/or materials. For example and without limitation, the rod 20 may include a first portion 50, a second portion 52, and/or a third portion 54, some or all of which may be substantially cylindrical. A diameter 54D of the third portion 54 may be larger than a diameter 52D of the second portion 52, and/or the diameter 52D of the second portion 52 may be larger than a diameter 50D of the first portion 50 (e.g., the rod 20 may include a stepped configuration). The first portion 50 of the rod 20 may be disposed at and/or include a first end 56 of the rod 20. The third portion 54 of the rod 20 may be disposed at and/or include a second end 58 of the rod 20. The second portion 52 may be disposed between (e.g., axially) the first portion 50 and the third portion 54. At least some of the rod 20 may be disposed in the drive screw 12, and/or the rod 20 and the drive screw 12 may be disposed concentrically. For example and without limitation, at least some of the first portion 50 and/or the second portion 52 may be disposed in the drive screw 12. The first portion 50 may extend axially beyond the drive screw 12 in a first direction (e.g., a first axial direction). The second portion 52 may extend axially beyond the drive screw 12 in a second, opposite direction. The third portion 54 may be disposed entirely outside of the drive screw 12. The rod 20 may be configured to hold/transfer compression and/or tension loads, such as in the event of a fracture of the drive screw 12.

In embodiments, the drive screw 12 and/or the rod 20 may be disposed at least partially in the housing member 18. For example and without limitation, the third portion 54, the second portion 52, and at least some of the first portion 50 of the rod 20 may be disposed in the housing member 18. The rod 20 may not be directly connected to the housing member 18. A retaining nut 22 may be disposed at and/or connected to a first end 56 of the rod 20, such as via a threaded connection. The retaining nut 22 may engage at least a portion of the rod 20 (e.g., the first portion 50) and may be configured to restrict relative movement between the rod 20 and the drive screw 12.

With embodiments, the mounting member 24 may be disposed at least partially within (e.g., radially inward of) the housing member 18 and/or may not be directly connected to the housing member 18. The mounting member 24 may include a receiving portion 70 that may be configured to at least partially receive the rod 20. For example and without limitation, the receiving portion 70 may be configured to receive the third portion 54 and at least some of the second portion 52 of the rod 20. An internal shape of the receiving portion 70 may correspond to an external shape of the third portion 54 of the rod 20, which may be substantially cylindrical and/or disk-shaped. The receiving portion 70 may include an aperture 72 through which the second portion 52 of the rod 20 may extend and/or be inserted. The receiving portion 70 may be configured to retain or restrict movement of the rod 20, such as in an axial direction. For example and without limitation, the diameter 72D of the aperture 72 may be larger than the diameter 52D of the second portion 52 and/or may be smaller than the diameter 54D of the third portion 54. The second mounting portion 44 may be connected to (e.g., screwed onto/into) the receiving portion 70. The receiving portion 70 may, for example and without limitation, include a generally C-shaped cross-section.

With embodiments, an actuator 10 may include a primary load path that may be configured to transfer loads between the first component 42 and the second component 46. The primary load path may include, for example and without limitation, the drive screw 12, the drive nut 14, the drive assembly 16, and/or the housing member 18. During normal operating conditions, all or substantially all loads may be transferred between the first component 42 and the second component 46 via the primary load path and the rod 20 may rotate substantially freely relative to the mounting member 24.

In embodiments, an actuator 10 may include a secondary or redundant load path. The secondary load path may be configured to transfer loads between the first component 42 and the second component 46, such as if there is a failure in the primary load path (e.g., a fracture of the drive screw 12). The second load path may include, for example and without limitation, the rod 20, the retaining nut 22, and/or the mounting member 24. In the event of a failure of the primary load path, all or substantially all loads may be transferred between the first component 42 and the second component 46 via the secondary load path.

With embodiments, an actuator 10 may include one or more friction surfaces or formations—referred to as friction surfaces—and generally illustrated as friction surfaces 80. The friction surfaces 80 may be disposed at or about the second end 58 of the rod 20 and/or may be connected to the mounting member 24. The friction surfaces 80 may include one or more of a variety of shapes, sizes, configurations, and/or materials. For example and without limitation, the friction surfaces 80 may include roughened portions, serrated portions, and/or other physical features or formations. The friction surfaces 80 may be configured to restrict rotation of the rod 20 in at least one direction, such as to provide braking torque to prevent back driving of the drive screw 12 (e.g., in the event of a drive screw fracture). During normal operation, friction surfaces 80 that may be associated with a secondary load path may not contact each other or other components and/or a clearance may be provided or exist between the rod 20 and the retaining nut 22. In the event of a drive screw disconnection, drive screw fracture, or other failure of the primary load path, the secondary load path may take or pick up the load, which may result in translation of the rod 20. Translation of the rod may allow and/or result in contact involving the friction surfaces 80, such as contact between the third portion 54 of the rod 20, the receiving portion 70 of the mounting member 24, and/or the friction surfaces 80. Such contact may provide braking torque and/or prevent back driving of the drive screw 12. With embodiments, if a mechanical disconnection or complete fracture occurs, components that might otherwise allow translation beyond the endplay between friction surfaces may turn into a brake mechanism, which may permit the disconnection to be mechanically detected.

With embodiments, an actuator 10 may include one or more sensors that may be configured to sense or detect a failure in a load path, such as in a primary load path and/or in a secondary load path. For example and without limitation, a sensor 90 may comprise a load sensing pin that may be connected to the mounting member 24. The sensor (or load sensing pin) 90 may be configured to detect a failure in a primary load path. A load sensing pin may have a cylindrical configuration and may extend at least partially into and/or through an aperture or recess 92 of the mounting member 24 (e.g., may be connected in a secondary load path).

In embodiments, a method of assembling an actuator 10 may include providing a drive screw 12 and a housing member 18. The drive screw 12 may be connected with the housing member 18. The housing member 18 may include a first mounting portion 40. The method may include providing a rod 20 and a mounting member 24. The mounting member 24 may include a second mounting portion 44 and/or a receiving portion 70. One or more friction surfaces 80 may be provided to one or both of the rod 20 (e.g., the third portion 54) and/or the mounting member (e.g., the receiving portion 70). The rod 20 may be inserted into and/or partially through the receiving portion 70 such that a first portion 50 of the rod 20 is disposed entirely outside of the receiving portion 70, a second portion 52 of the rod is disposed partially in the receiving portion 70, and/or a third portion 54 of the rod 20 is disposed in and retained by the receiving portion 70. The second mounting portion 44 may then be connected with (e.g., screwed into/onto) the receiving portion 70. The rod 20 may be inserted into the drive screw 12, such as after the rod 20 is inserted into the receiving portion 70. A retaining nut 22 may be connected to a first end 56 of the rod 20 and may restrict relative movement between the rod 20 and the drive screw 12. A drive nut 14 (e.g., a ball nut) may be connected to the drive screw 12. The housing member 18 may be connected to a first component 42 via the first mounting portion 40. Additionally or alternatively, the mounting member 24 may be connected to the first component 42, such as via the second mounting portion 44 and independently of the housing member 18 (e.g., the mounting member 24 may be directly connected to the first component 42 separately from the housing member 18). The drive nut 14 may be connected to a second component 46.

With embodiments, actuators 10 may not include a housing that envelops (or hides) significant portions of a redundant load path. For example and without limitation, at least some of the mounting member 24 may be externally visible (e.g., at least the aperture or recess 92 for the load sensor 90), in an assembled configuration, without removing/modifying the housing member 18. Additionally or alternatively, the housing member 18 may include an open side 94 that may provide visual access to some or most of the mounting member 24. Outer portions of the mounting member 24 may be spaced (e.g., radially inward) from the housing member 18, which may provide visual access to the mounting member 24. With embodiments, actuators 10 may be configured to permit detection of failures without removing the actuator 10 from an installed location (e.g., without disconnecting the first mounting portion 40 and the second mounting portion 44 from the first component 42, and/or disconnecting the drive nut 14 from the second component 46).

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. An actuator, comprising:

a housing member configured for connection with a first component;

a drive screw connected to the housing member;

a rod disposed at least partially in the drive screw;

a retaining nut connected to the rod;

a mounting member configured for connection with the first component; and a drive nut engaged with the drive screw and configured for connection with a second component;

wherein, if the drive screw mechanically disconnects or is fractured, the rod is configured to translate to engage one or more friction surfaces to restrict back driving of the drive screw; and the one or more friction surfaces are provided on one or both of the rod and the mounting member.

2. The actuator of claim 1, wherein a primary load path includes the drive screw, the drive nut, a drive assembly, and the housing member.

3. The actuator of claim 2, wherein the housing member includes a primary mounting portion.

4. The actuator of claim 2, wherein a secondary load path includes the rod, the retaining nut, the one or more friction surfaces, and the mounting member.

5. The actuator of claim 4, including a pin connected to the mounting member.

6. The actuator of claim 5, wherein the pin is configured to detect a failure in the primary load path.

7. The actuator of claim 4, wherein the secondary load path does not include the housing member.

8. The actuator of claim 4, including a sensor connected in the secondary load path and configured to sense or detect a failure in the primary load path.

9. The actuator of claim 1, wherein or more than one friction surfaces are provided on both of the rod and the mounting member.

10. The actuator of claim 1, wherein the mounting member is configured to restrict axial movement of the rod.

11. The actuator of claim 1, including a drive assembly; wherein the drive assembly is configured to rotate the drive screw to cause translation of the drive nut along the drive screw.

12. The actuator of claim 11, wherein the drive assembly includes a motor connected to a drive gear, and the drive gear is connected to the drive screw.

13. The actuator of claim 1, wherein the rod includes a first portion, a second portion, and a third portion; a diameter of the third portion is larger than a diameter of the second portion; and the diameter of the second portion is larger than a diameter of the first portion.

14. The actuator of claim 13, wherein at least some of the first portion and the second portion are disposed in the drive screw.

15. The actuator of claim 13, wherein the mounting member is configured to retain the third portion.

16. The actuator of claim 15, wherein the mounting member includes an aperture; and a diameter of the aperture is larger than the diameter of the second portion and smaller than the diameter of the third portion.

17. The actuator of claim 13, wherein the retaining nut is connected to a first end of the rod and the third portion is disposed at a second end of the rod.

18. The actuator of claim 13, wherein the first portion extends axially beyond the drive screw in a first direction; and the second portion extends axially beyond the drive screw in a second direction.

19. An actuator of comprising:

a housing member configured for connection with a first component;

a drive screw connected to the housing member;

a rod disposed at least partially in the drive screw;

a retaining nut connected to the rod;

a mounting member configured for connection with the first component; and a drive nut engaged with the drive screw and configured for connection with a second component;

wherein, if the drive screw mechanically disconnects or is fractured, the rod is configured to translate to engage one or more friction surfaces to restrict back driving of the drive screw, the mounting member is disposed at least partially within the housing member, and the mounting member is not directly connected to the housing member.

20. An actuator comprising:

a housing member configured for connection with a first component;

a drive screw connected to the housing member;

a rod disposed at least partially in the drive screw;

a retaining nut connected to the rod;

a mounting member configured for connection with the first component; and a drive nut engaged with the drive screw and configured for connection with a second component;

wherein, if the drive screw mechanically disconnects or is fractured, the rod is configured to translate to engage one or more friction surfaces to restrict back driving of the drive screw, the housing member includes a first mounting portion, the mounting member includes a second mounting portion, and the second mounting portion is independent of the first mounting portion.

21. An actuator, comprising:

a housing member configured for connection with a first component;

a drive screw connected to the housing member;

a rod disposed at least partially in the drive screw;

a retaining nut connected to the rod;

a mounting member configured for connection with the first component;

a pin connected to the mounting member; and a drive nut engaged with the drive screw and configured for connection with a second component;

wherein, if the drive screw mechanically disconnects or is fractured, the rod is configured to translate to engage one or more friction surfaces to restrict back driving of the drive screw; a primary load path includes the drive screw, the drive nut, a drive assembly, and the housing member; a secondary load path includes the rod, the retaining nut, the one or more friction surfaces, and the mounting member; and the pin is configured to detect a failure in the primary load path.

22. An actuator, comprising:

a housing member configured for connection with a first component;

a drive screw connected to the housing member;

a rod disposed at least partially in the drive screw;

a retaining nut connected to the rod;

a mounting member configured for connection with the first component; and a drive nut engaged with the drive screw and configured for connection with a second component;

wherein, if the drive screw mechanically disconnects or is fractured, the rod is configured to translate to engage one or more friction surfaces to restrict back driving of the drive screw; the rod includes a first portion, a second portion, and a third portion; a diameter of the third portion is larger than a diameter of the second portion; the diameter of the second portion is larger than a diameter of the first portion; the first portion extends axially beyond the drive screw in a first direction; and the second portion extends axially beyond the drive screw in a second direction.

* * * * *